(12) United States Patent
Osysko

(10) Patent No.: US 11,845,618 B1
(45) Date of Patent: Dec. 19, 2023

(54) PACKAGE TRANSFER SYSTEMS AND METHODS

(71) Applicant: SWIMC LLC, Cleveland, OH (US)

(72) Inventor: Brandon Osysko, Parma, OH (US)

(73) Assignee: SWIMC LLC, Cleveland, OH (US)

( * ) Notice: Subject to any disclaimer, the term of this patent is extended or adjusted under 35 U.S.C. 154(b) by 73 days.

(21) Appl. No.: 17/667,692

(22) Filed: Feb. 9, 2022

(51) Int. Cl.
*B65G 47/64* (2006.01)
*B65G 47/90* (2006.01)

(52) U.S. Cl.
CPC ........... *B65G 47/64* (2013.01); *B65G 47/905* (2013.01)

(58) Field of Classification Search
USPC ................................................ 198/358, 418
See application file for complete search history.

(56) References Cited

U.S. PATENT DOCUMENTS

| | | | | |
|---|---|---|---|---|
| 2,829,758 | A * | 4/1958 | Temple | B65G 47/54 198/444 |
| 2,993,583 | A * | 7/1961 | Sykes | B65G 47/54 198/601 |
| 4,267,917 | A | 5/1981 | Vogel | |
| 8,714,334 | B2 | 5/2014 | Yang et al. | |

FOREIGN PATENT DOCUMENTS

WO     WO 96/32205 A2     10/1996

* cited by examiner

*Primary Examiner* — William R Harp
(74) *Attorney, Agent, or Firm* — Mueting Raasch Group

(57) ABSTRACT

Package transfer systems and methods for moving packages in a conveyor system are described herein. The package transfer systems and methods include package stops that move between their open and closed configurations. In the closed configuration, the package stops prevent a package from moving through the location of the package stop. When placed on the perimeter of a transfer location into which packages are delivered by a delivery conveyor, the package stops provide for proper positioning of packages in the transfer location.

20 Claims, 6 Drawing Sheets

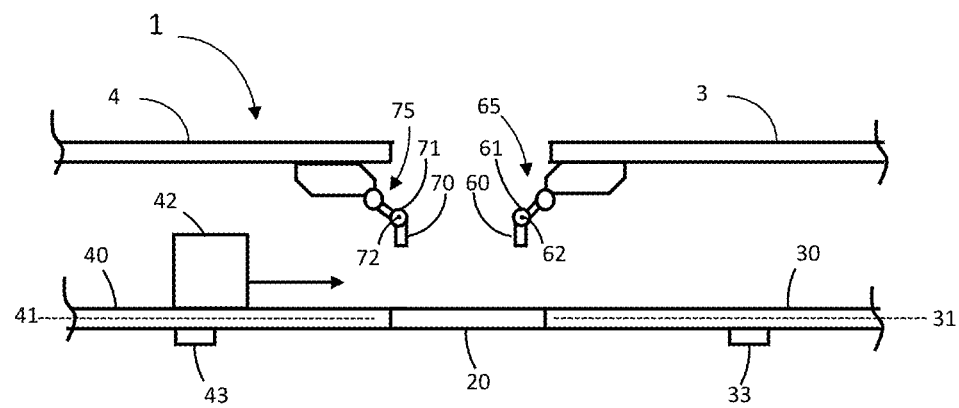
FIG. 2
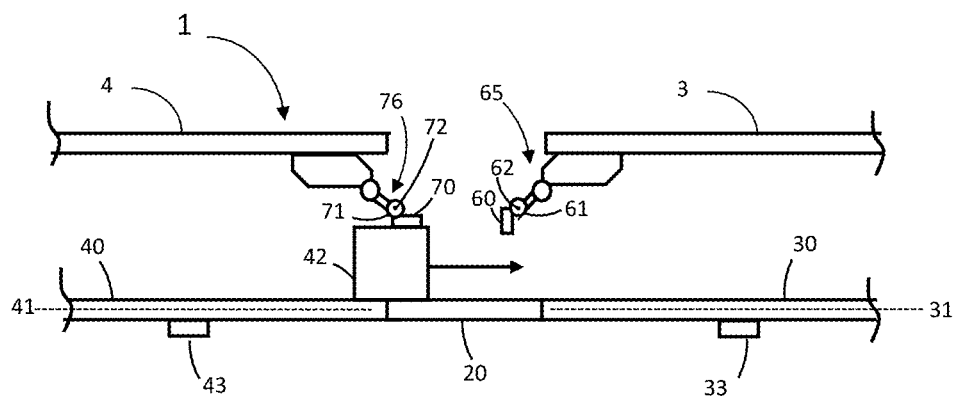
FIG. 3
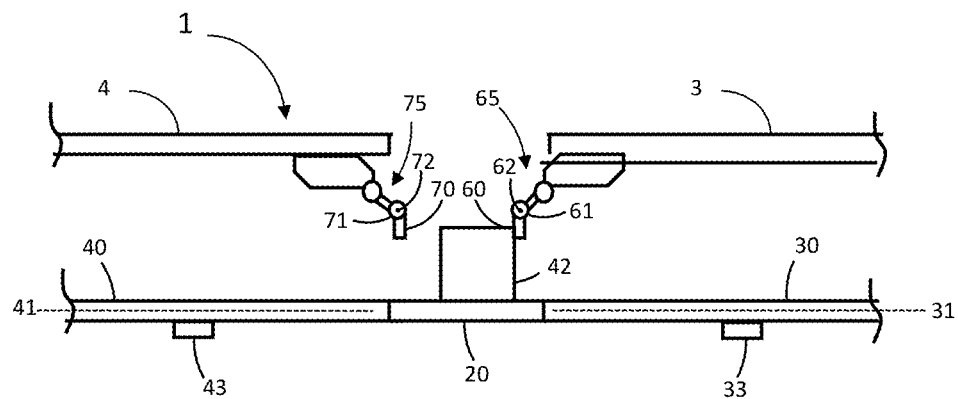
FIG. 4
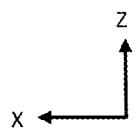

PACKAGE TRANSFER SYSTEMS AND METHODS

BACKGROUND

Conveyor systems are common in manufacturing and are used to transport goods (e.g., packages) from one location to another in an efficient manner. Conveyor systems may be complex, having multiple conveyors. There is often a need to transfer goods between conveyors on conveyor systems. As such, efficient package transfer systems are needed.

SUMMARY

Package transfer systems and methods for moving packages in a conveyor system are described herein.

The package transfer systems and methods include package stops that move between their open and closed configurations. In the closed configuration, the package stops prevent a package from moving through the location of the package stop. When placed on the perimeter of a transfer location into which packages are delivered by a delivery conveyor, the package stops provide for proper positioning of such packages in the transfer location.

In one or more embodiments, the package stops move passively between their open and closed configurations, allowing the movement of packages in one direction (into a transfer location) while preventing movement of a package in the opposite direction.

In one or more embodiments, passive movement of the package stops from the open configuration to the closed configuration is accomplished under the force of gravity. Avoiding the need for driven actuators used to move the package stops of package transfer systems as described herein from the open configuration to the closed configuration provides systems that are simpler and more robust as compared to systems using driven actuators to accomplish the same function.

In a first aspect, one or more embodiments of a package transfer system as described herein include: a transfer conveyor; a transfer location; a first delivery conveyor configured to deliver a first package to the transfer location, wherein the first delivery conveyor moves the first package into the transfer location along a first delivery axis; a second delivery conveyor configured to deliver a second package to the transfer location, wherein the second delivery conveyor moves the second package into the transfer location along a second delivery axis, wherein the first delivery axis and the second delivery axis are aligned with each other; a first package stop configured to stop the first package delivered to the transfer location along the first delivery axis such that the first package is positioned in the transfer location, the first package stop positioned on a side of the transfer location opposite from the first delivery conveyor such that the transfer location is located between the first delivery conveyor and the first package stop; a second package stop configured to stop the second package delivered to the transfer location along the second delivery axis such that the second package is positioned in the transfer location, the second package stop positioned on a side of the transfer location opposite from the second delivery conveyor such that the transfer location is located between the second delivery conveyor and the second package stop; wherein the first package moves past the second package stop when moving into the transfer location from the first delivery conveyor; wherein the second package stop comprises an open configuration and a closed configuration, wherein the second package stop is configured to move from the closed configuration to the open configuration by the first package moving past the second package stop when moving into the transfer location from the first delivery conveyor, and wherein the second package stop is configured to move from the open configuration to the closed configuration after the first package is in the transfer location; wherein the second package moves past the first package stop when moving into the transfer location from the second delivery conveyor; wherein the first package stop comprises an open configuration and a closed configuration, wherein the first package stop is configured to move from the closed configuration to the open configuration by the second package moving past the first package stop when moving into the transfer location from the second delivery conveyor, and wherein the first package stop is configured to move from the open configuration to the closed configuration after the second package is in the transfer location; a transfer conveyor drive apparatus configured to move the first package out of the transfer location along a transfer axis, the transfer conveyor drive apparatus comprising a transfer actuator configured to cause the transfer conveyor drive apparatus to move the first package out of the transfer location along the transfer axis; and a controller assembly operably coupled to the transfer actuator, the controller assembly configured to operate the transfer actuator to cause the transfer conveyor drive apparatus to move the first package out of the transfer location along the transfer axis.

One or more embodiments of the package transfer systems described herein include a first delivery conveyor actuator operably coupled to the controller assembly, a second delivery conveyor actuator operably coupled to the controller assembly, and a transfer conveyor actuator operably coupled to the controller assembly, wherein the controller assembly is configured to: operate the first delivery conveyor actuator to move the first package along the first delivery conveyor into the transfer location along the first delivery axis; operate the transfer actuator to move the first package out of the transfer location along the transfer axis after operating the first delivery conveyor actuator to move the first package into the transfer location; operate the transfer conveyor actuator to move the first package along the transfer axis after operating the transfer actuator to move the first package out of the transfer location along the transfer axis; and operate the second delivery conveyor actuator to move the second package along the second delivery conveyor into the transfer location along the second delivery axis after operating the transfer actuator to move the first package out of the transfer location.

In one or more embodiments of the package transfer systems described herein, the second package stop is configured to move from the closed configuration to the open configuration and from the open configuration to the closed configuration by rotation about a first rotational axis, and wherein the first package stop is configured to move from the closed configuration to the open configuration and from the open configuration to the closed configuration by rotation about a second rotational axis. In one or more embodiments, the first rotational axis is transverse to the second delivery axis. In one or more embodiments, the first rotational axis is parallel to the second rotational axis. In one or more embodiments, the rotation of the second package stop about the first rotational axis is passive.

In one or more embodiments of the package transfer systems described herein, the first package stop comprises a paddle. In one or more embodiments, the paddle is located above the first delivery conveyor.

In one or more embodiments of the package transfer systems described herein, the first package moves on the first delivery conveyor under the second package stop such that the first package is located between the second package stop and the first delivery conveyor when the second package stop is in the open configuration.

In one or more embodiments of the package transfer systems described herein, the transfer conveyor drive apparatus comprises a drive configuration and a retracted configuration, and wherein the transfer conveyor drive apparatus comprises a lift actuator operably coupled to the controller assembly, wherein the controller assembly is configured to operate the lift actuator to move the transfer conveyor drive apparatus between the drive configuration and the retracted configuration. In one or more embodiments, the transfer conveyor drive apparatus comprises a plurality of retractable wheels operably coupled to the transfer actuator comprising an inactive configuration wherein the retractable wheels are not in contact with the first package, and an active configuration wherein the wheels are in contact with the first package.

In one or more embodiments of the package transfer systems described herein, the transfer axis is perpendicular to the first delivery axis.

In one or more embodiments of the package transfer systems described herein, the first delivery axis and the second delivery axis are coextensive.

In one or more embodiments of the package transfer systems described herein, the system includes a second transfer conveyor having a second transfer axis. In one or more embodiments, the transfer conveyor drive apparatus is configured to move the first package out of the transfer location along the second transfer axis. In one or more embodiments, the transfer axis and the second transfer axis are coextensive.

In one or more embodiments of the package transfer systems described herein, the system comprises a sensor configured to detect the first package in the transfer location, the sensor coupled to the controller assembly, wherein the controller assembly is configured to operate the transfer conveyor drive apparatus to move the first package out of the transfer location based on a signal provided to the controller assembly by the sensor when the sensor detects the first package in the transfer location.

In a second aspect, one or more embodiments of a method, as described herein, of transferring packages in a package transfer system comprising a transfer location, a first delivery conveyor, a second delivery conveyor, a first package stop, and a second package stop include: delivering a first package to the transfer location using the first delivery conveyor, wherein delivering the first package comprises moving the first package past the second package stop, and wherein the first package moves the second package stop from a closed configuration to an open configuration while the first package is passing the second package stop; stopping the first package in the transfer location after moving the first package into the transfer location, wherein stopping the first package comprises contacting the second stop with the first package when the second stop is in a closed configuration; moving the first package out of the transfer location after stopping the first package in the transfer location; delivering a second package to the transfer location using the second delivery conveyor after moving the first package out of the transfer location, wherein delivering the second package comprises moving the second package past the first package stop, and wherein the second package moves the first package stop from the closed configuration to an open configuration while the second package is passing the first package stop; stopping the second package in the transfer location after moving the second package into the transfer location, wherein stopping the second package comprises contacting the first stop with the second package when the first stop is in a closed configuration; and moving the second package out of the transfer location after stopping the second package in the transfer location.

In one or more embodiments of methods of transferring packages in a package transfer system as described herein, gravitational force on the second package stop returns the second package stop to the closed configuration from the open configuration after the first package moves past the second package stop.

In one or more embodiments of methods of transferring packages in a package transfer system as described herein, gravitational force on the first package stop returns the first package stop to the closed configuration from the open configuration after the second package moves past the first package stop.

If used herein, relational terms such as above, below, top, bottom, etc. are (unless otherwise specified in this description and/or the claims) used only to facilitate description of the various features of the package transfer systems and methods described herein and should not be construed to require any specific orientation of the package transfer systems and/or the methods described herein unless otherwise specified (e.g., where gravitational force is used to effect a desired result).

When used herein, the term "aligned with" as used in connection with various components, axes, directions of travel, etc. includes both parallel and generally parallel arrangements. For example, two axes (or other components, features, etc.) may be described as "aligned with" when the axes (or other components, features, etc.) are both perfectly parallel with each other or nearly parallel, e.g., the axes (or other components, features, etc.) may form an angle with each other that is greater than 0° but 10° or less. In one or more embodiments, two delivery axes that are aligned with each other may be coextensive with each other.

If used herein, the term "substantially" has the same meaning as "significantly," and can be understood to modify the term that follows by at least about 75%, at least about 90%, at least about 95%, or at least about 98%. The term "not substantially" as used herein has the same meaning as "not significantly," and can be understood to have the inverse meaning of "substantially," i.e., modifying the term that follows by not more than 25%, not more than 10%, not more than 5%, or not more than 2%.

Numeric values used herein include normal variations in measurements as expected by persons skilled in the art and should be understood to have the same meaning as "approximately" and to cover a typical margin of error, such as ±5% of the stated value.

Terms such as "a," "an," and "the" are not intended to refer to only a singular entity but include the general class of which a specific example may be used for illustration.

The terms "a," "an," and "the" are used interchangeably with the term "at least one." The phrases "at least one of" and "comprises at least one of" followed by a list refers to any one of the items in the list and any combination of two or more items in the list.

As used here, the term "or" is generally employed in its usual sense including "and/or" unless the content clearly dictates otherwise. The term "and/or" means one or all of the listed elements or a combination of any two or more of the listed elements.

The recitations of numerical ranges by endpoints include all numbers subsumed within that range (e.g., 1 to 5 includes 1, 1.5, 2, 2.75, 3, 3.80, 4, 5, etc. or 10 or less includes 10, 9.4, 7.6, 5, 4.3, 2.9, 1.62, 0.3, etc.). Where a range of values is "up to" or "at least" a particular value, that value is included within the range.

The words "preferred" and "preferably" refer to embodiments that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure, including the claims.

The above summary of the invention is not intended to describe each embodiment or every implementation of the package transfer systems and methods described herein. Rather, a more complete understanding of the invention will become apparent and appreciated by reference to the following description of illustrative embodiments and claims in view of the accompanying figures of the drawing.

BRIEF DESCRIPTION OF THE DRAWING

FIG. 2 is side view of a first stage of transferring a package into a transfer location along a delivery conveyor using the package transfer system depicted in FIG. 1.

FIG. 3 is side view of a second stage of transferring a package into a transfer location along a delivery conveyor using the package transfer system depicted in FIG. 2.

FIG. 4 is side view of a third stage of transferring a package into a transfer location along a delivery conveyor using the package transfer system depicted in FIG. 2.

Figure 1:
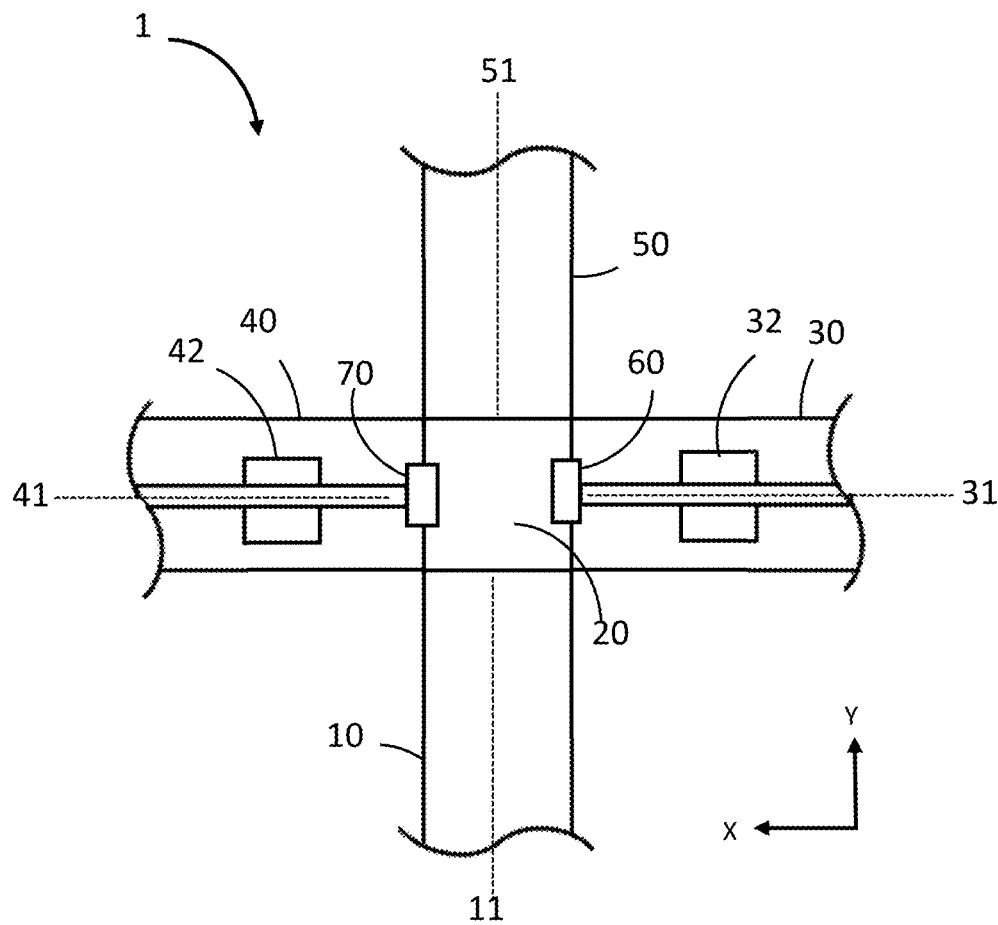
FIG. 1 is a top view of one illustrative embodiment of a package transfer system as described herein.

While the above-identified figures (which may or may not be drawn to scale) set forth embodiments of the invention, other embodiments are also contemplated, as noted in the discussion. In all cases, this disclosure presents the invention by way of representation and not limitation. It should be understood that numerous other modifications and embodiments can be devised by those skilled in the art, which fall within the scope of this invention.

DETAILED DESCRIPTION OF ILLUSTRATIVE EMBODIMENTS

In the following description, reference is made to the accompanying figures of the drawing which form a part hereof, and in which are shown, by way of illustration, specific embodiments. It is to be understood that other embodiments may be utilized and changes may be made without departing from the scope of the present invention.

FIGS. 1 through 12 depict various views and stages of one illustrative embodiment of a package transfer system 1 as described herein. The package transfer system 1 is generally configured to move a package from a delivery conveyor to transfer conveyor.

Figure 12:
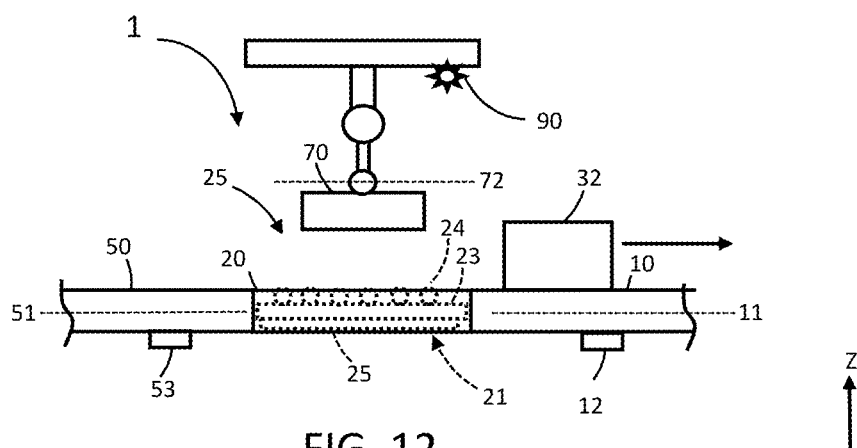
FIG. 12 is a side view of a third stage of the transfer conveyor drive apparatus of the package transfer system in FIG. 10.
Figure 13:
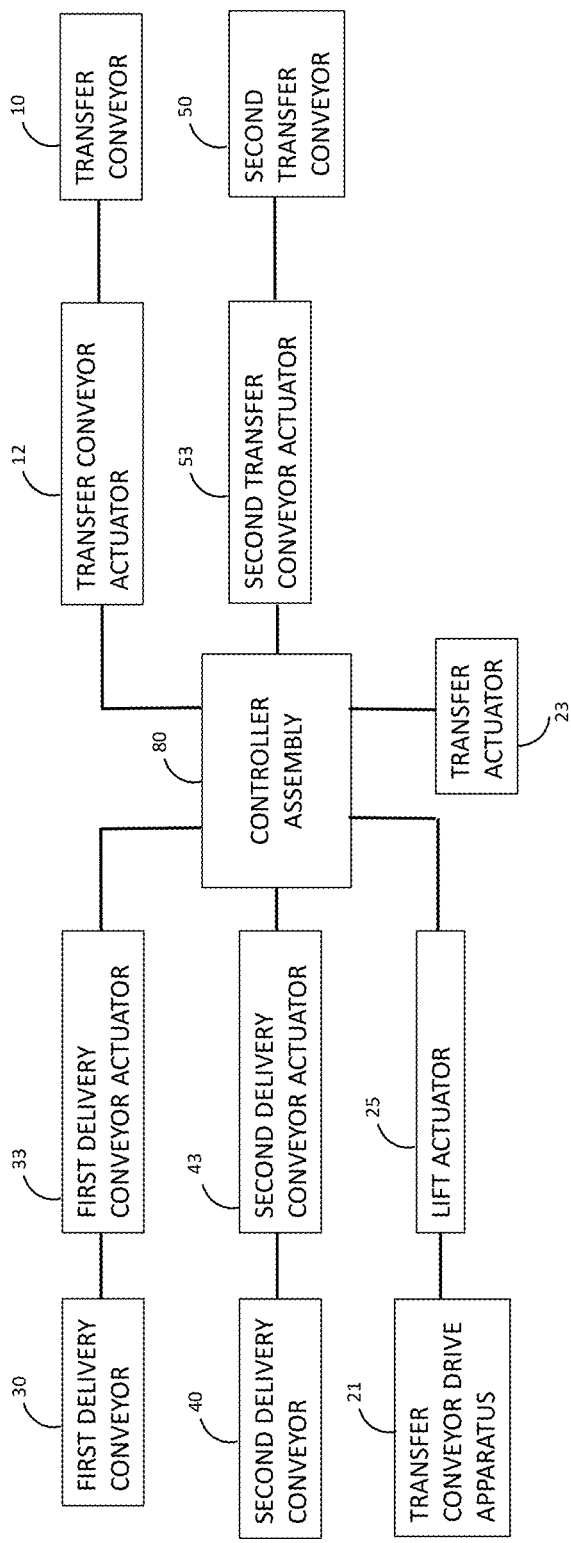
FIG. 13 is a schematic block diagram of components that may be found in one or more embodiments of the sorting systems as described herein.

The package transfer system 1 generally includes a transfer conveyor 10, a transfer location 20, a first delivery conveyor 30, a first package 32, a second delivery conveyor 40, a second package 42, a first package stop 70, a second package stop 60, a transfer conveyor drive apparatus 2321 (see, e.g., FIGS. 10-12), and a controller assembly 80 (see FIG. 13).

As used herein, the term "package" may refer to any discrete object that can be moved by a conveyor. Example objects include but are not limited to; empty containers or containers filled with one or more items; cans; cases; luggage; and the like. In some embodiments, the first package 32 and the second package 42 are similar, or the same, in volume and/or mass. In some embodiments the first package 32 and the second package 42 are not similar in volume and/or mass. In some embodiments, the first package 32 and the second package 42 are filled carboard containers.

The transfer conveyor 10 is generally configured to move a package, e.g., the first package 32 and/or another package, e.g., the second package 42 out of the transfer location 20 along the transfer axis 11 (see below for discussion of the transfer location 20). The transfer conveyor 10 may be any type of conveyor. Illustrative embodiments of conveyors may be in the form of, a belt conveyor, a roller conveyor, a ball conveyor, a slat conveyor, etc. The transfer conveyor, and as such, the transfer axis 11, may be at any angle relative to the transfer location 20. For example, in some embodiments, the transfer conveyor may be at an incline or a decline relative to the transfer location 20. In some embodiments, the transfer conveyor 10 may be a combination of conveyor types arranged in series. For example, in some embodiments, the transfer conveyor 10 may include two or more belt (or other) conveyors arranged in series.

Figure 10:
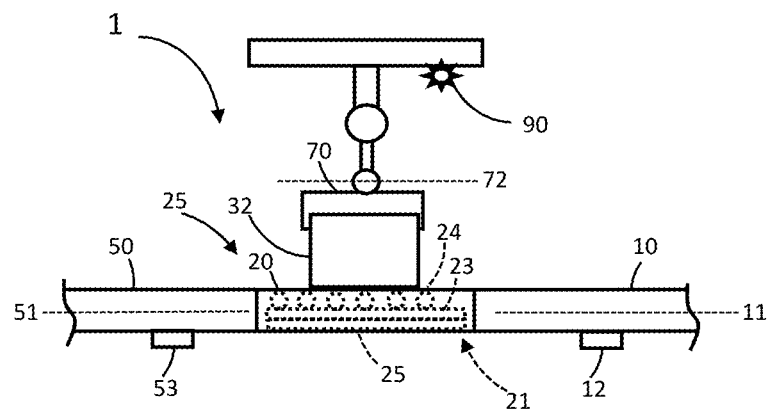
FIG. 10 is a side view of a first stage of one illustrative embodiment of a transfer conveyor drive apparatus of a package transfer system as described herein.
Figure 11:
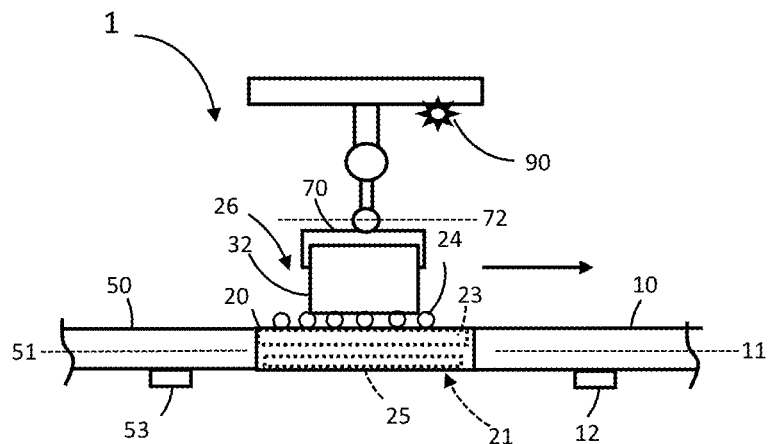
FIG. 11 is a side view of a second stage of the transfer conveyor drive apparatus of the package transfer system in FIG. 10.

The transfer conveyer 10 is physically coupled to a transfer conveyor actuator 12 (visible in FIGS. 10, 11, and 12). The transfer conveyor actuator 12 is generally configured to move a package, e.g., the first package 32 and/or another package, e.g., the second package 42 out of the transfer location 20 along the transfer axis 11. The transfer conveyor actuator 12 may be any actuator compatible with the transfer conveyor type employed such as a linear actuator, rotary actuator, and/or a combination thereof. Types of potentially suitable linear actuators include, but are not limited to, rotating cylinders, non-rotating cylinders, diaphragm cylinders, tandem cylinders, double rod end cylinders, telescopic rod cylinders, etc. Examples of potentially suitable rotary actuators include, but are not limited to, limited rotation actuators (such as, e.g., vane type actuators piston type actuators, etc.); continuous rotation actuators (such as, e.g., unidirectional motors, bi-directional motors, gear type motors, cane type motors, piston type motors, etc.), and others. The transfer conveyor actuator 12 may, in one or more embodiments, operate as an electric actuator, a hydraulic actuator, a pneumatic actuator, etc.

In some embodiments, the package transfer system 1 includes a second transfer conveyor 50. The second transfer conveyor 50 is generally configured to move packages, e.g., the first package 32 and/or another package, e.g., the second package 42 out of the transfer location 20 along the second transfer axis 51. The second transfer conveyor 50, and as such the second transfer axis 51, may be at any angle relative to the transfer location 20. For example, in some embodiments, the second transfer conveyor 50 may be at an incline or a decline relative to the transfer location 20. The second transfer conveyor 50 may be any type of conveyor or conveyor configuration known in the art such as those described elsewhere herein.

The second transfer conveyer 50 is physically coupled to a second transfer conveyor actuator 53 (see, e.g., FIGS. 10-13). The second transfer conveyor actuator 53 is, in one or more embodiments, generally configured to move packages, e.g., the first package 32 and/or another package, e.g., the second package 42 along the second transfer axis 51. The second transfer conveyor actuator 53 may be any type of as described herein.

In some embodiments, the transfer axis 11 and the second transfer axis 51 are aligned with each other as shown in FIG. 1. In some embodiments, the transfer axis 11 and the second transfer axis 51 are coextensive. In some embodiments, the transfer axis 11 and the second transfer axis are not aligned. In some embodiments, the transfer axis 11 is transverse to the second transfer axis 51. For instance, in some embodiments, the transfer axis 11 and the second transfer axis may be at an angle relative to one another. For example, in some embodiments, the transfer axis 11 may be at an incline or a decline (e.g., inclined or declined transfer conveyor 10) relative to second transfer axis 51.

The transfer location 20 is generally configured as the discrete location at which a package (e.g., the first package 32 and/or the second package 42) is transferred from one conveyor (e.g., the first delivery conveyor 30 and/or the second delivery conveyor 40) to another conveyor (e.g., the transfer conveyor 10 and/or the second transfer conveyor 50). In some embodiments, the transfer location 20 is the location at which the first package 32 is transferred from the first delivery conveyor 30 to the transfer conveyor 10. In some embodiments, the transfer location 20 is the location at which the second package 42 is transferred from the second delivery conveyor 40 to the transfer conveyor 10. In some embodiments, the transfer location 20 is the location at which the first package 32 is transferred from the first delivery conveyor 30 to the second transfer conveyor 50. In some embodiments, the transfer location 20 is the location at which the second package 42 is transferred from the second delivery conveyor 40 to the second transfer conveyor 50.

The first delivery conveyor 30 is generally configured to deliver packages, such as first package 32, to the transfer location 20 along the first delivery axis 31. The first delivery conveyor 30 may be any type of conveyor or configuration of conveyors as described herein. The first conveyor 30, and as such, the first delivery axis 31 may be at any angle relative to the transfer location 20. For example, in some embodiments, the first delivery conveyor may be at an incline or a decline relative to the transfer location 20. The first delivery conveyor is physically coupled to a first delivery conveyor actuator 33. The first delivery conveyor actuator 33 is generally configured to move packages such as first package 32 along the first delivery axis 31. The first delivery actuator 33 may be any type of actuator as described herein.

The second delivery conveyor 40 is generally configured to deliver packages, such as the second package 42, to the transfer location 20 along the second delivery axis 41. The second delivery conveyor 40 may be any type of conveyor or have any type of conveyor configuration as described herein. The second delivery conveyor 40, and as such, the second delivery axis 41 may be at any angle relative to the transfer location 20. For example, in some embodiments, the second delivery conveyor 40 may be at an incline or a decline relative to the transfer location 20. The second delivery conveyor 40 is physically coupled to the second delivery actuator 43. The second delivery actuator 43 is generally configured to move packages, such as the second package 42, along the second delivery axis 41. The second delivery actuator 43 may be any type of actuator as described herein.

In some embodiments, the first delivery axis 31 and the second delivery axis 41 are aligned with each other. In some embodiments, the first delivery axis 31 and the second delivery axis 41 are coextensive. In some embodiments, the first delivery axis 31 and the second delivery axis 41 are not aligned with each other. For example, in some embodiments, the first delivery axis 31 and/or the second delivery axis 41 may be at an incline or a decline (e.g., an inclined or declined first delivery conveyor 30 and/or second delivery conveyor 40) relative to the transfer location 20.

In some embodiments, the first delivery axis 31 and the transfer axis 11 are transverse to each other. In some embodiments, the first delivery axis 31 and the transfer axis 11 are perpendicular as shown in FIG. 1. In some embodiments, the first delivery axis 31 and the second transfer axis 51 are transverse to each other. In some embodiments, the first delivery axis 31 and the second transfer axis 51 are perpendicular as shown in FIG. 1. In some embodiments, the second delivery axis 41 and the transfer axis 11 are transverse to each other. In some embodiments, the second delivery axis 41 and the transfer axis 11 are perpendicular as shown in FIG. 1. In some embodiments, the second delivery axis 41 and the second transfer axis 51 are transverse to each other. In some embodiments, the second delivery axis 41 and the second transfer axis 51 are perpendicular as shown in FIG. 1.

Although the various axes (11, 31, 41, 51) as depicted in the illustrative embodiment are transverse (e.g., perpendicular) to each other to form a cross arrangement, in one or more alternative embodiments one or both of the delivery axes 31 and 41 may not be transverse to the one or both of the transfer axes 11 and 51.

Although the depicted illustrative embodiment of package transfer system 1 includes two delivery conveyors 30 and 40 configured to deliver packages to transfer location 20, one or more alternative embodiments of package transfer systems as described herein may include three or more delivery conveyors configured to deliver packages to a transfer location.

To access the transfer location 20, packages delivered to the transfer location 20 by the first delivery conveyor 30 (such as, e.g., the first package 32) pass the second package stop 60. To access the transfer location 20, packages delivered to the transfer location 20 by the second delivery conveyor 40 (such as, e.g., the second package 42) pass the first package stop 70.

In one or more embodiments, the first package stop 70 is positioned on the side of the transfer location 20 opposite from the first delivery conveyor 30 such that the transfer location is located between the first delivery conveyor 30 and the first package stop 70 (see, e.g., FIGS. 1-7). In one or more embodiments, the second package stop 60 is positioned on the side of the transfer location 20 opposite from the second delivery conveyor 40 such that the transfer location 20 is located between the second delivery conveyor 40 and the second package stop 60 (see, e.g., FIGS. 1-7).

The first package stop 70 is, in one or more embodiments, generally configured to stop packages such as, e.g., the first package 32 delivered to the transfer location 20 along the first delivery axis 11 such that the packages are positioned in the transfer location 20. The first package stop 70 is also, in one or more embodiments, generally configured to allow packages such as, e.g., the second package 42 to enter the transfer location 20 along the second delivery axis 41.

Figure 5:
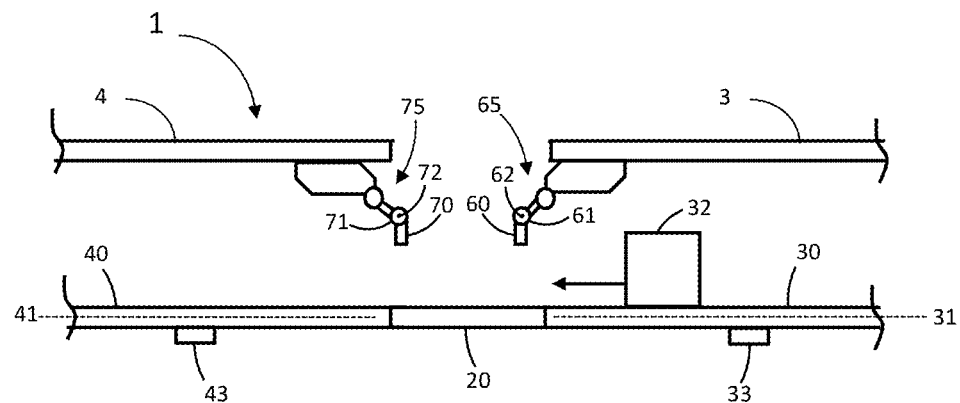
FIG. 5 is side view of a first stage of transferring another package into a transfer location along another delivery conveyor using the package transfer system depicted in FIG. 1.
Figure 6:
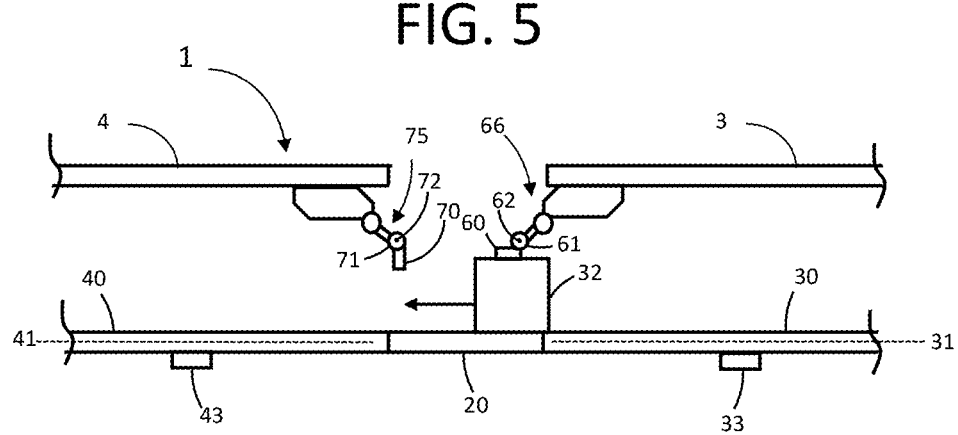
FIG. 6 is side view of a second stage of transferring another package into a transfer along another delivery conveyor location using the package transfer system depicted in FIG. 5.

Turning to FIGS. 2-7, the first package stop 70 includes, in the depicted embodiment, an open configuration 76 and a closed configuration 75. The open configuration 76 is generally configured to allow packages such as, e.g., the second package 42 to enter the transfer location 20 (FIG. 2) from the second delivery conveyor 40. The closed configuration 75 is generally configured to prevent packages such as, e.g., the first package 32 from traveling through and out of the transfer location 20 along the first delivery axis 31 (FIG. 6).

In some embodiments, the first package stop 70 is located above the second delivery conveyor 40 such that packages (such as the second package 42) moving into the transfer location 20 on the second delivery conveyor 40 pass under the first package stop 70 such that a package (e.g., second package 42) is located between the first package stop 70 and the second delivery conveyor 40 when the first package stop 70 is in the open configuration 76. For example, in some embodiments as shown in FIGS. 2-6, the first package stop 70 is mounted on a frame 4 located above the transfer location 20.

Although not shown, in one or more alternative embodiments, the first package stop 70 may be located adjacent to the second delivery conveyor 40 such that packages (e.g., second package 42) moving towards the transfer location 20 pass by the first package stop 70 when the first package stop 70 is in the open configuration 76. For example, the first package stop 70 may be mounted on or near the second delivery 40 conveyor such that a package (e.g., second package 42) passes next to the first package stop 70.

Although not shown, in one or more alternative embodiments, the first package stop 70 may be located below (or within) the second delivery conveyor 40 such that the package (e.g., second package 42) is located above the first package stop when the first package stop 70 is in the open configuration 76. For example, the first package stop 70 may be mounted below (or within) the second delivery conveyor 40 such that a (e.g., second package 42) passes over the first package stop 70 to enter the transfer location 20 when the first package stop 70 is in the open configuration 76.

In some embodiments, the first package stop 70 may be in the form of one or more paddles. In some embodiments, as depicted in FIGS. 2-12 the first package stop 70 is in the form of a single paddle. In one or more alternative embodiments, the first package stop 70 may be in the form of two or more paddles or other structures capable of stopping packages moving into the transfer location 20 from the first delivery conveyor 30.

The depicted illustrative embodiment of the first package stop 70 alternates between the open configuration 76 and the closed configuration 75 through rotation about a first rotational axis 72. To alternate from the closed configuration 75 to the open configuration 76, the first package stop 70 rotates in a first direction about the first rotational axis 72. To alternate from the open configuration 76 to the closed configuration 75, the first package stop rotates about the first rotational axis 72 in the opposite direction.

In one or more embodiments, the rotation about the first rotational axis 72 is passive, that is, the rotational motion is not driven by a mechanical or other actuator. For example, in some embodiments, the first package stop 70 rotates about the first rotational axis 72 from the closed configuration 75 to the open configuration 76 due to transfer of kinetic energy from physical contact with a package (e.g., such as second package 42). Additionally, in some embodiments when the first package stop 70 is mounted above the second delivery conveyor 40, the first package stop 70 rotates about the first rotational axis 72 from the open configuration 76 to the closed configuration 75 due to the force of gravity (see FIGS. 2-4). In one or more embodiments, the rotation about the first rotational axis 72 from the open configuration 76 to the closed configuration 75 and/or from the closed configuration 75 to the open configuration 76 may be assisted by one or more biasing elements/devices, e.g., springs, pneumatic or hydraulic cylinders, magnets, etc.

In some embodiments, the first package stop 70 is configured to rotate about rotational apparatus 71. Generally, the first rotational axis 72 is commensurate with the rotational axis of the rotation apparatus 71. The rotational apparatus 71 may be any apparatus that allows for the first package stop 70 to rotate about the first rotational axis 72. In some embodiments, the first rotational apparatus 71 may include multiple components. For example, in some embodiments, the first rotational apparatus 71 may include two flange bearings 71/71' as shown in FIGS. 8 and 9 (FIGS. 8 and 9 are discussed in more detail below) that define the axis 72.

In some embodiments, the first package stop 70 has limited rotation about the first rotational axis 72. The amount of rotation may be measured in degrees where the closed configuration 75 is defined as zero degrees. From the closed configuration 75, the direction in which the first package stop 70 rotates to achieve the open configuration 76 is defined as the positive direction. From the closed configuration 75, the direction opposite the direction in which the first package stop rotates to the open configuration is defined as the negative direction. In some embodiments, the first package stop 70 is prevented from rotating in the negative direction. Preventing the first package stop 70 from rotating in the negative direction allows the first package stop 70 to prevent a package (e.g., the first package 32) from moving along the first delivery axis 31 through the transfer location 20. In some embodiments, the rotation apparatus 71 itself is designed to prevent rotation in the negative direction. Alternatively, or additionally, in some embodiments, one or more additional components, such as mechanical stops, etc., may prevent rotation in the negative direction.

Figure 8:
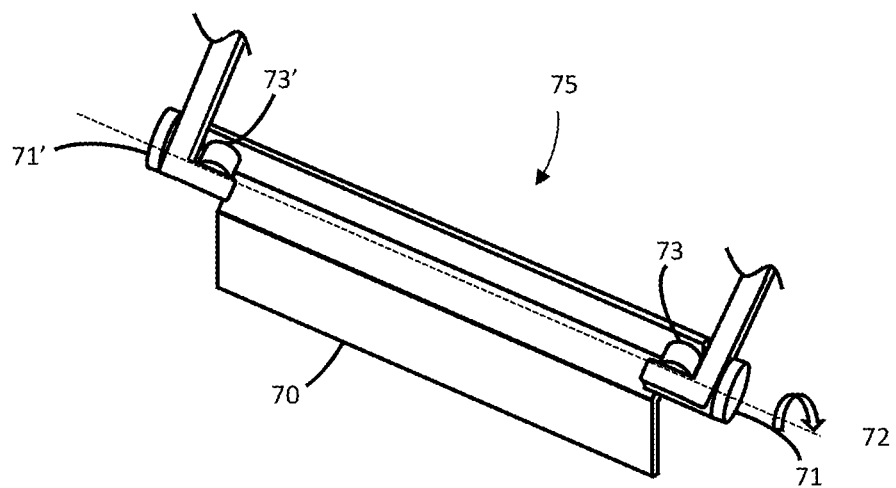
FIG. 8 is perspective view of one illustrative embodiment of a package stop in a closed configuration as described herein.
Figure 9:
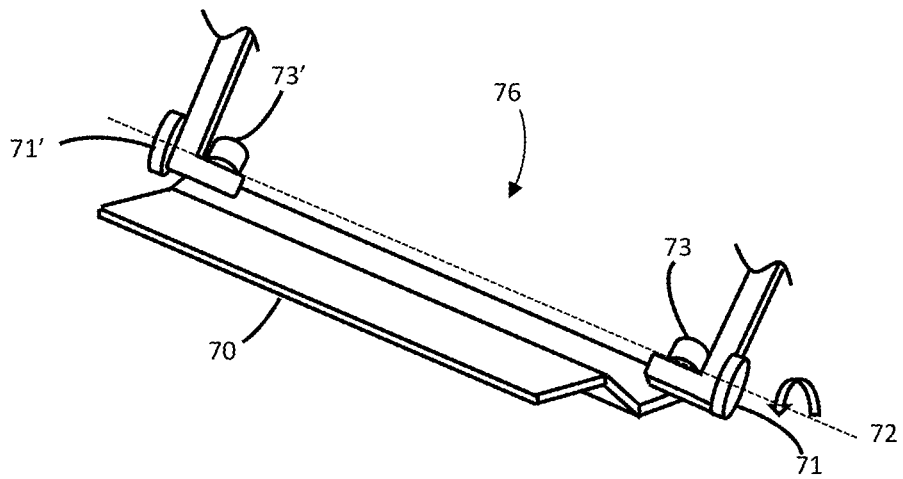
FIG. 9 is perspective view the package stop in FIG. 8 in an open configuration.

FIGS. 8 and 9 depict one illustrative embodiment of a first package stop 70 in the closed configuration 75 (FIG. 8) and the open configuration 76 (FIG. 9). In this exemplary embodiment, the first package stop 70 is a single paddle. The first rotational apparatus 71 is a pair of flange bearings 71 and 71' (although many other structures could be used in place of flange bearings). The first rotational axis 72 is commensurate with the rotational axis of the first rotational apparatus 71/71'. Two mechanical stops 73/73' are positioned such as to prevent the first package stop 70 from rotating in the negative direction about the first rotational axis 72. In the closed configuration 75, the first package stop 70 rests against the mechanical stops 73/73'. To go from the closed configuration 75 (FIG. 8) to the open configuration 76 (FIG. 9), the first package stop 70 (in the depicted illustrative embodiment) rotates in a first direction (clockwise as depicted in FIGS. 8-9). To return to the closed configuration 75 from the open configuration 76, the first package stop 70 rotates in the opposite direction (counterclockwise as depicted in FIGS. 8-9). During the process of rotating from the open configuration 76 to the closed configuration 75, the mechanical stops 73/73' prevent the first package stop 70 from over rotating in the counterclockwise direction past the closed configuration 75.

Similar to the first package stop 70, the second package stop 60 is generally configured to stop a package (e.g., such as the second package 42) delivered to the transfer location 20 along the second delivery axis 41 such that the package is positioned in the transfer location 20. The second package stop 60 is also generally configured to allow a package (e.g., such as the first package 32) to pass through to the transfer location 20 along the first delivery axis 31.

Turning to FIGS. 2-6, the second package stop 60 includes an open configuration 66 and a closed configuration 65. The open configuration 66 is generally configured to allow a package (e.g., such as the first package 32) to enter the transfer location 20 (FIG. 6). The closed configuration 65 is generally configured to prevent a package (e.g., such as the second package 42) from traveling through the transfer location along the second delivery axis 41 (FIG. 6).

The second package stop 60 may be in any location relative to the first delivery conveyor 30 and the first package 32 as was previously describe for the second package stop 70 relative to the second delivery conveyor 40 and the second package 42.

In one or more embodiments, as depicted in FIGS. 2-7, the first package stop 70 and the second package stop 60 may be in the same location relative to the delivery conveyors. For example, in some embodiments, the first package stop 70 is located above the second delivery conveyor 40 such that packages moving into the transfer location 20 on the second delivery conveyor 40 pass under the first package stop 70; and the second package stop 60 is located above the first delivery conveyor 30 such that packages moving into the transfer location 20 on the first delivery conveyor 30 pass under the second package stop 60.

In one or more embodiments, the first package stop 60 and the second package stop 70 may have different relative locations. For example, in some embodiments, the first package stop 70 is located above the second delivery conveyor 40 such that the package moving into the transfer location 20 on the second delivery conveyor 40 passes under the first package stop 70; and the second package stop 60 is located adjacent to the first delivery conveyor 30 such that a package moving into the transfer location 20 on the first delivery conveyor 40 passes next to the second package stop 60.

In some embodiments, the second package stop 60 is in the form of one or more paddles. The second package stop 60 may, however, be provided in any configuration as described with respect to the first package stop 70.

The depicted illustrative embodiment of the second package stop 60 alternates between the open configuration 66 and the closed configuration 65 through rotation about a second rotational axis 62. To alternate from the closed configuration 65 to the open configuration 66, the second package stop 60 rotates in a first direction. To alternate from the open configuration 66 to the closed configuration 65, the second package stop 60 rotates in the opposite direction.

In one or more embodiments, the rotation of the second package stop 60 about the second rotational axis 62 is passive, that is, the rotational motion is not driven by a mechanical or other actuator. For example, in some embodiments, the second package stop 60 rotates about the second rotational axis 62 from the closed configuration 65 to the open configuration 66 due to transfer of kinetic energy from contact with a package (e.g., such as the first package 32). Additionally, in some embodiments, the second package stop 60 rotates about the second rotational axis 62 from the open configuration 66 to the closed configuration 65 due to gravity. In one or more embodiments, the rotation about the second rotational axis 62 from the open configuration 66 to the closed configuration 65 and/or from the closed configuration 65 to the open configuration 66 may be assisted by one or more biasing elements/devices, e.g., springs, pneumatic or hydraulic cylinders, magnets, etc.

In one or more embodiments, the first rotational axis 72 (of the first package stop 70) and the second rotational axis (of the second package stop 60) may be substantially parallel, for example, as depicted in FIGS. 2-7.

In some embodiments, the second package stop 60 is configured to rotate about the second rotational axis 62 by rotational apparatus 61. The rotational apparatus 61 may be any apparatus that allows for the second package stop 60 to rotate around the second rotational axis 62.

In some embodiments, the second package stop 60 has limited rotation about the second rotational axis 62. The amount of rotation may be measured in degrees where the closed configuration 65 is defined as zero degrees. From the closed configuration 65, the direction in which the second package stop 60 rotates to achieve the open configuration 66 is defined as the positive direction. From the closed configuration 65, the direction opposite the direction in which the first package stop 60 rotates to achieve the open configuration is defined as the negative direction. In some embodiments, the second package stop 60 is prevented from rotating in the negative direction. Preventing the second package stop 60 from rotating in the negative direction allows the second package stop 60 to stop a package (e.g., such as the second package 42) from moving along the second delivery axis 41 through the transfer location 20. In some embodiments, the rotational apparatus 61 itself is designed to prevent rotation in the negative direction. Alternatively, or additionally, in some embodiments, one or more additional components, such as mechanical stops, etc. may be provided to prevent rotation in the negative direction (see, e.g., FIGS. 8 and 9 and the relevant description elsewhere herein).

Figure 7:
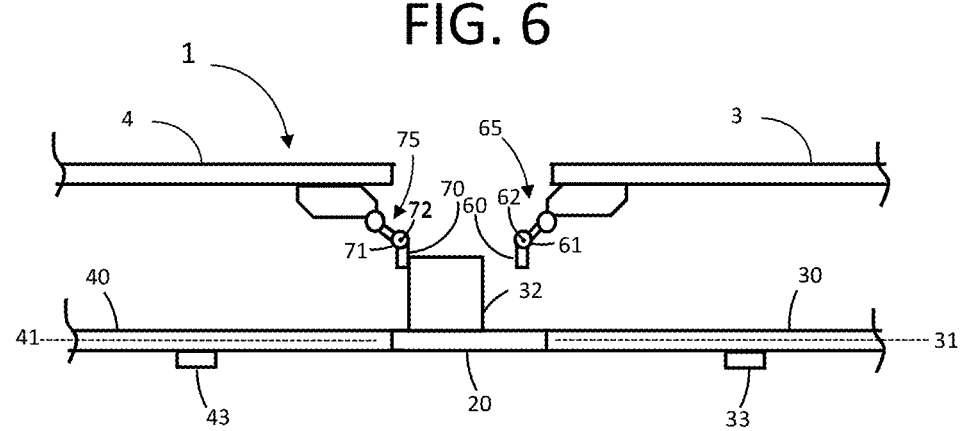
FIG. 7 is side view of a third stage of transferring another package into a transfer location along another delivery conveyor using the package transfer system depicted in FIG. 5.

FIGS. 2-7 depict stages of the first package stop 70 and the second package 60 stop, including open and closed configurations, during the transfer of the second package 42 to the transfer location 20 (FIGS. 2-4) and the transfer of the first package 32 to the transfer location 20 (FIGS. 5-7).

Specifically, FIGS. 2-5 depict three stages of delivering the second package 42 to the transfer location 20. In the first stage (FIG. 2), the second package 42 travels on the second delivery conveyor 40 along the second delivery axis 41 towards the transfer location 20 (as indicated by the arrow).

In the first stage, the first package stop 70 is in the closed configuration 75 and the second package stop 60 is in the closed configuration 65.

In the second stage (FIG. 3), the second package 42 makes physical contact with the first package stop 70. The kinetic motion of the second package 42 causes the first package stop 70 rotate in the positive direction about the first rotational axis 72 into the open configuration 76. In this exemplary embodiment, the first package stop 70 rotates in the counterclockwise direction about the first rotational axis 72 to achieve the open configuration 76. While the first package stop 70 is in the open configuration 76, the second package 42 passes the first package stop 70 and enters the transfer location 20. In this illustrative embodiment, passing the first package stop 70 includes passing under the first package stop 70.

In the third stage (FIG. 4), the second package 42 has completely passed the first package stop 70, and the first package stop 70 has rotated counterclockwise about the first rotational axis 72 back into the closed configuration 75. In this illustrative embodiment, the force of gravity causes the first package stop 70 to rotate counterclockwise about the first rotational axis 72 back into the closed configuration 75.

In the depicted illustrative embodiment, movement of the second package 42 along the second delivery axis 41 causes the second package 42 to make physical contact with second package stop 60 (as depicted in FIG. 4). In this exemplary embodiment, when the second package stop 60 is in the closed configuration and is prevented from rotating in the negative direction, the second package stop 60 prevents the second package 42 from leaving the transfer location 20 along the second delivery axis 41.

FIGS. 5-7 depict three stages of delivering the first package 32 to the transfer location 20. In the first stage (FIG. 5), the first package 32 travels on the first delivery conveyor 30 along the first delivery axis 31 towards the transfer location 20 (as indicated by the arrow). In this stage, the second package stop 60 is in the closed configuration 65 and the first package stop 70 is in the closed configuration 75.

In the second stage (FIG. 6), the first package 32 makes physical contact with the second package stop 60. The kinetic motion of the first package 32 causes the second package stop 60 to rotate in the positive direction about the first rotational axis 62 into the open configuration 66. In this exemplary embodiment second package stop 60 rotates clockwise in the positive direction about the second rotational axis 62 into the open configuration 66. While the second package stop 60 is in the open configuration 66, the first package 32 passes the second package stop 60 and enters the transfer location 20. In this embodiment, passing the second package stop 60 includes passing under the first package stop 60.

In the third stage (FIG. 7), the first package 32 has completely passed the second package stop 60 and the second package stop 60 has rotated counterclockwise about the second rotational axis 62 back into the closed configuration 65. In this exemplary embodiment, the force of gravity causes the second package stop 60 to rotate in the counterclockwise about the second rotational axis 62 back into the closed configuration 65.

In the depicted illustrative embodiment, movement of the first package 32 along the first delivery axis 31 causes the first package 32 to make physical contact with the first package stop 70 (as depicted in FIG. 7). In this exemplary embodiment, when the first package stop 70 is in the closed configuration and is prevented from rotating in the negative direction, the first package stop 70 prevents the first package 32 from leaving the transfer location 20 along the first delivery axis 31.

Turning now to FIGS. 10 through 12, one or more embodiments of the package transfer system 1 described herein may include a transfer conveyor drive apparatus 21. The transfer conveyor drive apparatus 21 is generally configured to move a package (e.g., such as the first package 32 and/or the second package 42) out of the transfer location 20 along a transfer axis (e.g., such as the transfer axis 11 and/or along the second transfer axis 51).

In one or more embodiments, the transfer conveyor drive apparatus 21 includes a transfer actuator 23. The transfer actuator 23 is generally configured to cause the transfer conveyor drive apparatus 21 to move a package (e.g., such as the first package 32 and/or the second package 42) out of the transfer location 20 along a transfer axis (e.g., such as the transfer axis 11 and/or along the second transfer axis 51). The transfer actuator 23 may be any actuator as described herein.

FIGS. 10-12 depict an illustrate embodiment of a transfer conveyor drive apparatus 21. In this exemplary embodiment, the transfer conveyor drive apparatus 21 includes a retracted configuration 25 and a drive configuration 26. When the transfer conveyor drive apparatus 21 is in the drive configuration 26, a package (e.g., the first package 32 and/or the second package 42) is moved out of the transfer location 20. In this exemplary embodiment, the transfer conveyor drive apparatus 21 includes a lift actuator 25. The lift actuator 25 is generally configured to move the transfer conveyor drive apparatus 21 between the drive configuration 26 and the retracted configuration 25.

In this exemplary embodiment, the transfer conveyor drive apparatus 21 includes a plurality of retractable wheels 24. The plurality of retractable wheels 24 is operably coupled the transfer actuator 23. The plurality of wheels includes an active configuration in which the wheels are in contact with a package located in the transfer location 20 (e.g., such as the first package 32 and/or second package 42). The plurality of wheels is in the active configuration when the transfer conveyor drive apparatus is in the drive configuration 26. When the plurality of wheels is in the active configuration, the transfer actuator 23 is configured to rotate the wheels propelling the package located in the transfer location 20 onto a transfer conveyor (e.g., the transfer conveyor 10 and/or the second transfer conveyor 50). The plurality of wheels also includes an inactive configuration in which the retractable wheels 24 are not in contact with the package located in the transfer location 20. The plurality of wheels is in the inactive configuration when the transfer drive apparatus 21 is in the retracted configuration 25.

FIGS. 10-12 depict three stages of an illustrative embodiment of a transfer conveyor drive apparatus 21 moving the first package 32 out of the transfer location 20 along a transfer axis 11. In the first stage (FIG. 10), the first package 32 is located in the transfer location 20. The transfer conveyor drive apparatus 21 is in the reattracted configuration 21 such that plurality of wheels 40 is in the inactive configuration.

In the second stage (FIG. 11), the lift actuator changes the transfer conveyor drive apparatus 21 from the retracted configuration 25 to the drive configuration 26. In the drive configuration 26, the plurality of wheels are in the active configuration (e.g., the plurality of wheels are contacting the first package 32). The transfer drive actuator 23 causes the wheels to rotate thus moving the first package out of the transfer location 20 onto the transfer conveyor 10 along the transfer axis 11.

In the third stage (FIG. 11), the first package 32 has left the transfer location 20 and the lift actuator has reset the transfer conveyor drive apparatus 21 into the retracted configuration 25.

Although FIGS. 10-12 depict an exemplary embodiment of a transfer conveyor drive apparatus 21, an artisan will appreciate that other known transfer conveyor drive apparatus configurations may be suitable for use with the present package transfer system 1. Although the depicted illustrative embodiments involve moving packages out of the transfer locations generally horizontally (that is, in the planes along which the packages are delivered to the transfer locations), in one or more alternative embodiments packages maybe moved out of the transfer location vertically. For example, in systems which packages are delivered to the transfer location in planes generally aligned with an X-Y plane, packages could be moved out of the transfer location along the Z axis by, for example, dropping/lowering packages out of the transfer location and/or lifting/raising packages out of the transfer location).

In some embodiments, the package transfer system 1 may include a sensor 90 (see FIGS. 10-12) configured to detect a package (e.g., such as the first package 32 and/or the second package 42) in the transfer location 20. The sensor 90 may be coupled to the controller assembly 80 (see below for discussion of the controller assembly). In these embodiments, the controller assembly 80 may be configured to operate the transfer conveyor drive apparatus 21 to move the package located in the transfer location 20 out of the transfer location 20 based on a signal provided to the controller assembly 80 by the sensor 90 when the sensor 90 detects the package in the transfer location 20.

The package transfer system 1 includes a controller assembly 80. The controller assembly 80 is generally configured to operate the first delivery actuator 33 to move the first package 32 along the first delivery conveyor 30 into the transfer location 20 along the first delivery axis 31. The controller assembly 80 is generally configured to operate the transfer actuator 23 to move the first package 32 out of the transfer location 20 along the transfer axis 11. The controller assembly 80 is generally configured to operate the second transfer conveyor actuator 53 to move the first package along the transfer axis 51. The controller assembly 80 is generally configured to operate the second delivery actuator 43 to move the second package 42 along the second delivery conveyor 40 into the transfer location 20 along the second delivery axis 41.

In some embodiments, the controller assembly 80 is configured to operate the lift actuator 25 to move the transfer conveyor drive apparatus 21 between the drive configuration 26 and a retracted configuration 25. In some embodiments, the controller assembly 80 is configured to operate the transfer drive actuator 23. In some embodiments, the controller assembly 80 is configured to operate the transfer conveyor drive apparatus 21 to move a package in the transfer location 20 (e.g., such as the first package 32 and/or the second package 42) out of the transfer location 20 based on a signal provided to the controller assembly 80 by a sensor 90 when the sensor 90 detects the package in the transfer location 20.

In some embodiments, the controller assembly 80 is configured to control the package transfer system 1 by executing a series of steps. In some embodiments, the series of steps the controller assembly 80 executes may include 1) operating a delivery actuator (e.g., such as the first delivery actuator 33) to move a package (e.g., such as the first package 32) on a delivery conveyor (e.g., such as the first delivery conveyor 30) into the transfer location 20 along a delivery axis (e.g., such as the first delivery axis 31; 2) operating a transfer actuator (e.g., such as the transfer actuator 23) to move the package out of the transfer location 20 along the transfer axis; 3)operating a transfer conveyor actuator (e.g., the transfer conveyor actuator 12) to move the package on the transfer conveyor (e.g., the transfer conveyor 10) along the transfer axis; 4) operating another delivery conveyor actuator (e.g., the second delivery conveyor actuator 53) to move another package (e.g., second package 42) on another delivery conveyor (e.g., the second delivery conveyor 40) into the transfer location 20 along another delivery axis (e.g., the second delivery axis 41); and 5) operating the transfer actuator 23 to move another out of the transfer location 20 along the transfer axis. In some embodiments, step 2 includes operating a lift actuator 25 prior to operating the transfer actuator 23 to move the package out of the transfer location along the transfer axis. In some embodiments an additional step 6 may be included in which the controller assembly operates the transfer conveyor actuator to move another package on the transfer conveyor along the transfer axis. In some embodiments, the series of steps the controller assembly 80 executes may include 1) operating a delivery actuator (e.g., such as the first delivery actuator 33) to move a package (e.g., such as the first package 32) on a delivery conveyor (e.g., such as the first delivery conveyor 30) into the transfer location 20 along a delivery axis (e.g., such as the first delivery axis 31; 2) operating a transfer actuator (e.g., such as the transfer actuator 23) to move the package out of the transfer location 20 along the transfer axis; 3) operating a transfer conveyor actuator (e.g., the transfer conveyor actuator 12) to move the package on the transfer conveyor (e.g., the transfer conveyor 10) along the transfer axis; 4) operating another delivery conveyor actuator (e.g., the second delivery conveyor actuator 43) to move another package (e.g., second package 42) on another delivery conveyor (e.g., the second delivery conveyor 40) into the transfer location 20 along another delivery axis (e.g., the second delivery axis 41); and 5) operating another transfer actuator (e.g., the second transfer actuator 53) to move another package out of the transfer location 20 along another transfer axis (e.g., the second transfer axis 51). In some embodiments, step 2 and/or step 5 may include operating a lift actuator 25 prior to operating the transfer actuator and/or another transfer actuator to move the package out of the transfer location 20 along the transfer axis or along another transfer axis. In some embodiments an additional step 6 may be included in which the controller assembly operates another transfer conveyor actuator (e.g., the second transfer conveyor actuator 53) to move another package on another transfer conveyor (e.g., the second transfer conveyor 50) along another transfer axis (e.g., the second transfer axis 51).

In some embodiments, the series of steps the controller assembly 80 executes may include 1) operating a delivery actuator (e.g., the first delivery actuator 33 or the second delivery actuator 43) to move a package (e.g., the first package 32 or the second package 42) on a delivery conveyor (e.g., the first delivery conveyor 30 or the second delivery conveyor 40) into the transfer location 20 along a delivery axis (e.g., the first delivery axis 3)1 and 2) operating a transfer actuator (e.g., the transfer actuator 23) to move the package out of the transfer location 20 along a transfer axis (e.g., the transfer axis 11 or the second transfer axis 51). In some embodiments, step 2 includes operating the lift actuator 25 prior to operating the transfer actuator 23 to move the package out of the transfer location along the transfer axis. In some embodiments an additional step 6 may be included in which the controller assembly operates a transfer conveyor actuator (e.g., the first transfer conveyor actuator 13 or the second transfer conveyor actuator 53) to move the package on a transfer conveyor (e.g., the first transfer conveyor 10 or the second transfer conveyor 50) along the transfer axis.

The controller assembly 80 may be provided in any suitable form and may, for example, include memory and a controller. The controller may, for example, be in the form of one or more microprocessors, Field-Programmable Gate Arrays (FPGA), Digital Signal Processors (DSP), microcontrollers, Application Specific Integrated Circuit (ASIC) state machines, etc. The controllers may include one or more of any suitable input devices configured to allow a user to operate the poultry toe and claw systems described herein (e.g., keyboards, touchscreens, mice, trackballs, etc.), as well as display devices configured to convey information to a user (e.g., monitors (which may or may not be touchscreens), indicator lights, etc.). Although not depicted separately, the controller assembly 80 may incorporate a pneumatic and/or hydraulic control system in those systems in which one or more of the actuators use pneumatic and/or hydraulic components.

All references and publications cited herein are expressly incorporated herein by reference in their entirety into this disclosure, except to the extent they may directly contradict this disclosure. Although specific illustrative embodiments have been described herein, it will be appreciated by those of ordinary skill in the art that a variety of alternate and/or equivalent implementations can be substituted for the specific embodiments shown and described without departing from the scope of the present disclosure. It should be understood that this disclosure is not intended to be unduly limited by the illustrative embodiments and examples set forth herein and that such examples and embodiments are presented by way of example only with the scope of the disclosure intended to be limited only by the claims.

What is claimed is:

1. A package transfer system comprising:
    a transfer conveyor;
    a transfer location;
    a first delivery conveyor configured to deliver a first package to the transfer location, wherein the first delivery conveyor moves the first package into the transfer location along a first delivery axis;
    a second delivery conveyor configured to deliver a second package to the transfer location, wherein the second delivery conveyor moves the second package into the transfer location along a second delivery axis, wherein the first delivery axis and the second delivery axis are aligned with each other;
    a first package stop configured to stop the first package delivered to the transfer location along the first delivery axis such that the first package is positioned in the transfer location, the first package stop positioned on a side of the transfer location opposite from the first delivery conveyor such that the transfer location is located between the first delivery conveyor and the first package stop;
    a second package stop configured to stop the second package delivered to the transfer location along the second delivery axis such that the second package is positioned in the transfer location, the second package stop positioned on a side of the transfer location opposite from the second delivery conveyor such that the transfer location is located between the second delivery conveyor and the second package stop;
    wherein the first package moves past the second package stop when moving into the transfer location from the first delivery conveyor;
    wherein the second package stop comprises an open configuration and a closed configuration, wherein the second package stop is configured to move from the closed configuration to the open configuration by the first package moving past the second package stop when moving into the transfer location from the first delivery conveyor, and wherein the second package stop is configured to move from the open configuration to the closed configuration after the first package is in the transfer location;
    wherein the second package moves past the first package stop when moving into the transfer location from the second delivery conveyor;
    wherein the first package stop comprises an open configuration and a closed configuration, wherein the first package stop is configured to move from the closed configuration to the open configuration by the second package moving past the first package stop when moving into the transfer location from the second delivery conveyor, and wherein the first package stop is configured to move from the open configuration to the closed configuration after the second package is in the transfer location;
    a transfer conveyor drive apparatus configured to move the first package out of the transfer location along a transfer axis, the transfer conveyor drive apparatus comprising a transfer actuator configured to cause the transfer conveyor drive apparatus to move the first package out of the transfer location along the transfer axis; and
    a controller assembly operably coupled to the transfer actuator, the controller assembly configured to operate the transfer actuator to cause the transfer drive apparatus to move the first package out of the transfer location along the transfer axis.

2. The package transfer system of claim 1, further comprising a first delivery conveyor actuator operably coupled to the controller assembly, a second delivery conveyor actuator operably coupled to the controller assembly, and a transfer conveyor actuator operably coupled to the controller assembly, wherein the controller assembly is configured to:
    operate the first delivery conveyor actuator to move the first package along the first delivery conveyor into the transfer location along the first delivery axis;
    operate the transfer actuator to move the first package out of the transfer location along the transfer axis after operating the first delivery conveyor actuator to move the first package into the transfer location;
    operate the transfer conveyor actuator to move the first package along the transfer axis after operating the transfer actuator to move the first package out of the transfer location along the transfer axis; and
    operate the second delivery conveyor actuator to move the second package along the second delivery conveyor into the transfer location along the second delivery axis after operating the transfer actuator to move the first package out of the transfer location.

3. The package transfer system of claim 1, wherein the second package stop is configured to move from the closed configuration to the open configuration and from the open configuration to the closed configuration by rotation about a first rotational axis, and wherein the first package stop is configured to move from the closed configuration to the open configuration and from the open configuration to the closed configuration by rotation about a second rotational axis.

4. The package transfer system of claim 3, wherein the first rotational axis is transverse to the second delivery axis.

5. The package transfer system of claim 3, wherein the first rotational axis is parallel to the second rotational axis.

6. The package transfer system of claim 3, wherein the rotation of the second package stop about the first rotational axis is passive.

7. The package transfer system of claim 1, wherein the first package stop comprises a paddle.

8. The package transfer system of claim 7, wherein the paddle is located above the first delivery conveyor.

9. The package transfer system of claim 1, wherein the first package moves on the first delivery conveyor under the second package stop such that the first package is located between the second package stop and the first delivery conveyor when the second package stop is in the open configuration.

10. The package transfer system of claim 1, wherein the transfer conveyor drive apparatus comprises a drive configuration and a retracted configuration, and wherein the transfer conveyor drive apparatus comprises a lift actuator operably coupled to the controller assembly, wherein the controller assembly is configured to:
operate the lift actuator to move the transfer conveyor drive apparatus between the drive configuration and the retracted configuration.

11. The package transfer system of claim 10, wherein the transfer conveyor drive apparatus comprises a plurality of retractable wheels operably coupled to the transfer actuator comprising an inactive configuration wherein the retractable wheels are not in contact with the first package, and an active configuration wherein the wheels are in contact with the first package.

12. The package transfer system of claim 1, wherein the transfer axis is perpendicular to the first delivery axis.

13. The package transfer system of claim 1, wherein the first delivery axis and the second delivery axis are coextensive.

14. The package transfer system of claim 1, further comprising a second transfer conveyor having a second transfer axis.

15. The package transfer system of claim 14, wherein the transfer conveyor drive apparatus is configured to move the first package out of the transfer location along the second transfer axis.

16. The package transfer system of claim 14, wherein the transfer axis and the second transfer axis are coextensive.

17. The package transfer system of claim 1, wherein the system comprises a sensor configured to detect the first package in the transfer location, the sensor coupled to the controller assembly, wherein the controller assembly is configured to operate the transfer conveyor drive apparatus to move the first package out of the transfer location based on a signal provided to the controller assembly by the sensor when the sensor detects the first package in the transfer location.

18. A method of transferring packages in a package transfer system comprising a transfer location, a first delivery conveyor, a second delivery conveyor, a first package stop, and a second package stop, the method comprising:
delivering a first package to the transfer location using the first delivery conveyor, wherein delivering the first package comprises moving the first package past the second package stop, and wherein the first package moves the second package stop from a closed configuration to an open configuration while the first package is passing the second package stop;
stopping the first package in the transfer location after moving the first package into the transfer location, wherein stopping the first package comprises contacting the first package stop with the first package when the first package stop is in a closed configuration;
moving the first package out of the transfer location after stopping the first package in the transfer location;
delivering a second package to the transfer location using the second delivery conveyor after moving the first package out of the transfer location, wherein delivering the second package comprises moving the second package past the first package stop, and wherein the second package moves the first package stop from the closed configuration to an open configuration while the second package is passing the first package stop;
stopping the second package in the transfer location after moving the second package into the transfer location, wherein stopping the second package comprises contacting the second package stop with the second package when the second package stop is in the closed configuration; and
moving the second package out of the transfer location after stopping the second package in the transfer location.

19. A method according to claim 18, wherein gravitational force on the second package stop returns the second package stop to the closed configuration from the open configuration after the first package moves past the second package stop.

20. A method according to claim 18, wherein gravitational force on the first package stop returns the first package stop to the closed configuration from the open configuration after the second package moves past the first package stop.

* * * * *